Nov. 11, 1969   R. JOHNSTON ETAL   3,477,413
CRANKCASE BREATHER SYSTEM AND STRUCTURE
Filed March 25, 1968
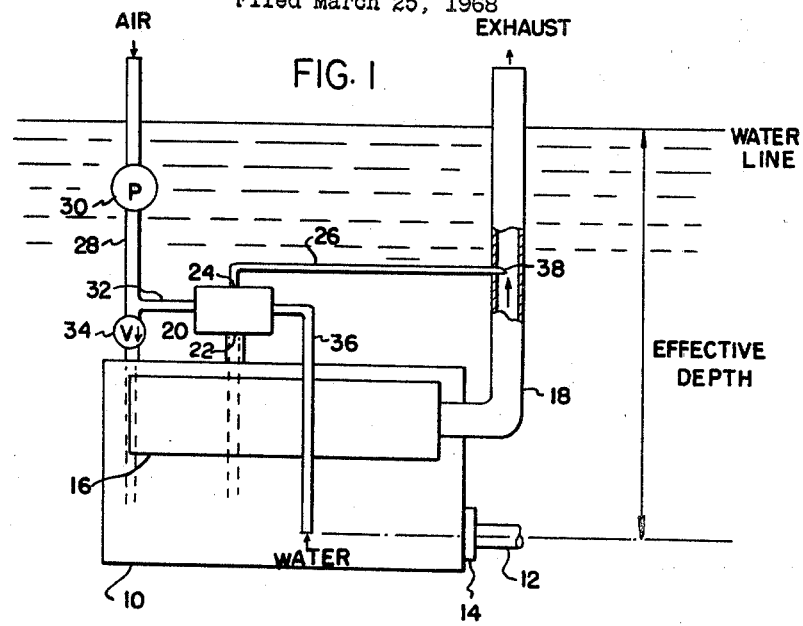
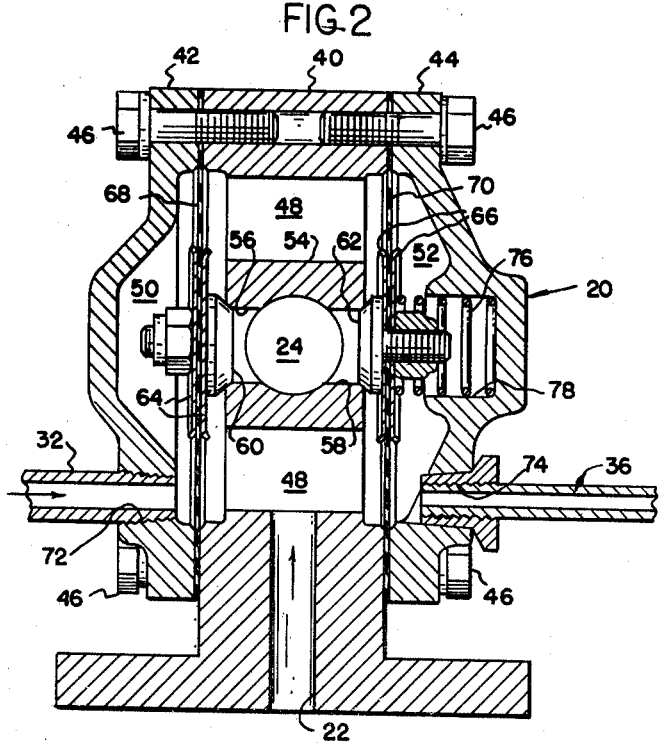
INVENTORS
RAYMOND JOHNSTON
EDWIN G. MORAN
RALPH J. CLARK
BY Hauke, Krass, Gifford, & Patalidis
ATTORNEYS United States Patent Office 3,477,413
Patented Nov. 11, 1969

3,477,413
CRANKCASE BREATHER SYSTEM AND STRUCTURE
Raymond Johnston, Madison Heights, Edwin G. Moran, Centerline, and Ralph J. Clark, Detroit, Mich., assignors to Continental Motors Corporation, Muskegon, Mich., a corporation of Virginia
Filed Mar. 25, 1968, Ser. No. 715,689
Int. Cl. F02b 77/00
U.S. Cl. 123—1         15 Claims

ABSTRACT OF THE DISCLOSURE

A crankcase breather system for a water-submersible internal combustion engine having one valve operable as crankcase pressure increases above a preselected value to vent crankcase gases under non-submerged operation and a second valve openable at a higher crankcase pressure during submersion, with the first valve being held closed during submersion.

BACKGROUND OF THE INVENTION

Field of the invention

The present invention relates to internal combustion engines for use in propelling vehicles, such as Army trucks, tanks and the like, which are required to ford streams and rivers under conditions during which the engine itself may be partially or completely submerged. In such engines, the air intake to the carburetor or air intake manifold, as well as the exhaust pipe outlet are located at high enough levels that they will be above the water surface when the engine is submerged. It is necessary to use in such engines a crankcase breather system which will vent crankcase gases to some point at which the water will not enter the breather system and hence the crankcase. Since positive ventilation of the crankcase is desirable at all times, and since during periods of submersion it will be necessary to pressurize the crankcase to a sufficient degree which will prevent water from leaking in past the crankshaft seal, a valving system is necessary in the crankcase breather to provide for varying situations including non-submerged as well as submerged operations.

Description of the prior art

A valving system for submersible engines is illustrated in United States Patent No. 2,775,960 in which a valve is used which, when the engine is not submerged is actuated to vent crankcase gases into the air intake system by means of a valve which responds to the pressure differential between crankcase and atmospheric pressures, and when the engine is submerged, the valving system is actuated to vent the gases to the air intake manifold in response to pressure differentials between crankcase pressure and the pressure of the water covering the valve.

SUMMARY OF THE INVENTION

In the present invention, a double valving system is provided in the crankcase breather system in which the gases are vented into the exhaust pipe outlet of the engine, the valving system being such that one valve will open in response to a small increase in crankcase pressure operable to open the valve against the forces of a small suction applied at the valve outlet, for operation when the engine is not submerged, and the second valve is operable to open in response only to a higher pressure greater than or substantially equal to the crankcase pressure when the engine is submerged, the first valve being retained in a closed position at such time by means provided for this purpose.

DESCRIPTION OF THE DRAWING

A more complete understanding of the invention will be provided by reference to the accompanying drawing illustrating a preferred embodiment of the invention in which like reference characters refer to like parts throughout the several views and in which FIG. 1 is a diagrammatic view of an engine showing the present invention and associated conduits and pipes, and FIG. 2 is a cross-sectional view of the crankcase breather valve structure embodying the present invention.

DESCRIPTION OF THE PREFERRED EMBODIMENT

In FIG. 1 an internal combustion engine 10 is illustrated diagrammatically as having a crankshaft 12 extending outwardly through a crankshaft seal 14, an engine exhaust manifold 16 with an upstanding exhaust pipe 18, a crankcase breather valve assembly 20 having a crankcase gas intake 22, a gas vent opening 24 and a conduit 26 leading therefrom to the exhaust pipe 18. An air intake pipe 28 or the like having a preferred pressurizing means such as a pump 30 is provided to pressurize the crankcase and various necessary engine components when the engine is submerged and a branch conduit 32 or the like provides means for introducing this pressurized air to the breather valve assembly 20 as will be described. A check valve 34 or the like is preferably provided to prevent escape of the crankcase gases back through the air intake pipe 28. Another conduit 36 or the like is provided to introduce water or water pressure to the breather valve assembly from a point which is approximately at the effective depth of water when the engine is submerged, measured from the crankshaft seal 14 to the waterline as indicated. It will be seen that the conduit 26 leading to the exhaust pipe 18 terminates in a beveled outlet opening 38 disposed such that the engine exhaust gases passing through the exhaust pipe 18 will impose a slight suction in the conduit 26 and at the vent opening 24 of the valve assembly 20.

The breather valve assembly 20 is illustrated in more detail in FIG. 2 as comprising a three-part housing having a central portion 40 and a pair of cap portions 42 and 44 secured to the central portion 40 by any means such as screws 46 or the like. The housing portions 40, 42, and 44 are recessed as shown to provide a central crankcase pressure chamber 48, an air pressure control chamber 50, and a water pressure control chamber 52. The central housing portion 40 is provided with a boss portion internally of the chamber 48 and containing the vent opening 24 which is connected by means of the conduit 26 to the exhaust pipe 18 as above described. The boss portion 54 has a pair of oppositely extending passages 56 and 58 opening at each side into the chamber 48 but adapted to be normally closed respectively by valve members 60 and 62 seated on the open ends of the passages 56 and 58. The valves 60 and 62 are connected respectively by means of discs 64 and 66 to pressure sensitive diaphragm members 68 and 70, which are clamped between the central housing portion 40 and the end caps 42 and 44 respectively, thereby providing the aforesaid control chambers 50 and 52 as shown. The diaphragms 68 and 70 are subjected on their inner sides to the pressure within the crankcase of the engine 10 through the inlet 22. The diaphragm 68 is subject on its outer surface to pressures introduced through the conduit 32 into an inlet port 72. The diaphragm 70 is subject on its outer side to the pressures introduced through conduit 36 to the inlet port 74.

In addition, the valves 60 and 62 are subjected to the valve closing tendency produced by the small suction sensed through the conduit 26 to the vent opening 24, which suction pressure tends to hold the valves closed against the crankcase pressure exerted on diaphragms 68 and 70 tending to open said valves. The valve 62 is further held in a closed position by means of a spring 76 compressed between the outermost disc 66 and an internal recess 78 provided in the end cap 44.

Operation of the breather valve system when the engine 10 is operating non-submerged in the atmosphere, is as follows:

The diaphragm 68 serves to actuate the valve 60 in response to an increase in the pressure differential of the crankcase pressures in chamber 48 and atmospheric pressures in chamber 50, the pump 30 not being operated at times of non-submersion. When this differential reaches a predetermined value, or in effect when the crankcase pressure reaches a predetermined value, the diaphragm 68 will actuate to open the valve 60 against the small valve-closing suction force sensed at the vent opening 24, and the crankcase gases will be permitted to escape from the chamber 48 through the opening 24 and conduit 26 into the exhaust pipe 18.

When the engine 10 is submerged, as when the vehicle is fording a stream or the like, the pump 30, or whatever device is used, will be started to pressurize the crankcase and other necessary engine components to a pressure necessary to keep the water from leaking into the crankcase through the crankshaft seal 14. This air pressure is also admitted into the pressure sensing chamber 50 of the breather valve assembly 20 to retain the valve 60 in a firmly closed position at all times. The diaphragm 70 responds to the pressure differential of the crankcase pressure in chamber 48 and pressures in the chamber 52, plus the valve closing compression of the spring 76. As can be seen, the pressure in chamber 52 will be approximately the same as the water pressure at the level or effective depth of the crankshaft seal 14, the water pressure being sensed through the conduit 36 admitted to the inlet 74. The spring 76 is preferably designed to exert a valve-closing force equivalent to about 30 inches of water depth. When the crankcase pressures build up sufficiently, the differential pressure across the diaphragm 70 will open the valve 62, permiting crankcase gases to exhaust through the opening 24, conduit 26 and into the exhaust pipe 18.

The aforementioned air pressure which is allowed to enter the various components of the engine during submersion has been calibrated to be approximately between 4 to 6 p.s.i.g. which solves the requirements for a submersion of up to 30 inches as measured from the sealed crankshaft to water line level. If for any reason, a submersion takes place that is more than the 30 inches mentioned, the water pressure which enters the chamber 52 will add to the valve-closing force of the spring 76, so that during submersion, the gases escaping from the crankcase must, in passing through the valve assembly, overcome the spring pressure plus the water pressure in the chamber 52 which varies in accordance with the submersion level. Thus, the deeper the engine is submerged, the greater is the differential across the diaphragm 70 needed to open the valve 52 for exhaust of the crankcase fumes.

Although we have described and shown only one preferred embodiment of our invention, it will be apparent to those skilled in the art to which the invention pertains that various changes and modifications may be made therein without departing from the spirit of the invention as expressed by the scope of the appended claims.

What is claimed is:

1. A crankcase breather valve system for water-submersible internal combustion engines, comprising:
   (a) a pair of breather pasages connected at one end with the interior of the engine crankcase and at the other end with a vent opening,
   (b) a normally closed valve in each passage,
   (c) means opening one valve responsively to a first predetermined increased pressure in said crankcase, and
   (d) means retaining said one valve closed and opening the other valve responsively to a second predetermined increased pressure in said crankcase.

2. The system as defined in claim 1 and in which said second pressure has a higher value than said first pressure.

3. The system as defined in claim 1 and in which pressures are predetermined such that one valve is operable to open only when said engine crankcase is not submerged and the other valve is operable to open only when said engine crankcase is submerged.

4. The system as defined in claim 1 and in which:
   (a) said vent opening has means producing a small suction on the vent side of said valves tending to urge at least said one valve toward a closed position, and
   (b) said first mentioned means includes a pressure responsive member subjected to the differential of forces between crankcase and atmospheric pressures and operable to open said one valve when said differential overcomes the valve closing force of said suction on the vent side of the valves.

5. The system as defined in claim 1 and in which:
   (a) said other valve has means exerting a substantially constant closing force on said valve, and
   (b) said second mentioned means includes a pressure responsive member subjected to a differential of forces between crankcase and water pressures and operable to open said other valve when said differential overcomes the valve closing force of said means exerting a substantially constant closing force on said valve.

6. The system as defined in claim 4 and including means selectively increasing pressure above atmospheric on the atmospheric pressure side of said pressure responsive member.

7. The system as defined in claim 5 and in which said substantially fixed closing force is substantially the equivalent of water pressure force operative on said pressure responsive member due to about thirty inches of submersion depth measured from the crankshaft seal to the waterline level.

8. A crankcase breather valve structure for water-submersible internal combustion engines, comprising:
   (a) a housing having a cavity,
   (b) a pair of pressure sensitive members dividing said cavity into three pressure chambers,
   (c) an inlet passage connecting a first chamber with the interior of the engine urankcase,
   (d) a pair of outlet passages connecting said first chamber with a vent opening,
   (e) a valve associated with each outlet passage and each operably connected with a pressure sensitive member for operation thereby, said valves being normally closed,
   (f) one of said pressure sensitive members being operable to open its valve responsively to a first predetermined increased pressure in said crankcase, and
   (g) the other of said pressure sensitive members being operable to open its valve responsively to a second predetermined increased pressure in said crankcase.

9. The structure as defined in claim 8 and in which said second pressure has a higher value than said first pressure.

10. The structure as defined in claim 8 and in which said pressures are predetermined such that one pressure sensitive member is actuated to open its valve only when said engine crankcase is not submerged and the other pressure sensitive member is actuated to open its valve only when said engine crankcase is submerged.

11. The structure as defined in claim 8 and in which:
   (a) said vent opening has means producing a small suction on the vent side of said valves tending to hold at least one valve in closed position,
   (b) means normally connecting a second chamber with atmospheric pressure, said pressure sensitive member associated with the suction-closed valve being subjected to the differential of forces between the first and the second chamber pressures, and operable to open the associated valve when said differential overcomes the valve closing force of said suction on the vent side of said valves.

12. The srtucture as defined in claim 8 and in which:
  (a) one of said valves has means exerting a substantially constant closing force on said valve,
  (b) the pressure sensitive member associated with the valve on which said closing force is exerted being subjected to the differential of forces between crankcase pressure and said constant closing force and operable to open the associated valve when said differential overcomes said valve closing force.

13. The structure as defined in claim 12 and including means connecting a second chamber with water when the engine crankcase is submerged, the force of water pressure being added to said constant closing force when said engine crankcase is submerged beyond a preselected depth.

14. The structure as defined in claim 11 and including means selectively increasing pressure in said second chamber above atmospheric.

15. The structure as defined in claim 13 and in which said substantially fixed closing force is substantially the equivalent of water pressure force in said second chamber due to about thirty inches of submersion depth measured from the engine crankshaft seal to the waterline level.

References Cited
UNITED STATES PATENTS

| | | | |
|---|---|---|---|
| 2,429,732 | 10/1947 | Roos | 123—1 |
| 2,775,960 | 1/1957 | Druzynski | 123—119 |
| 2,782,773 | 2/1957 | Stone | 123—1 |

WENDELL E. BURNS, Primary Examiner

U.S. Cl. X.R.

123—198

FO-1050
(5/69)

UNITED STATES PATENT OFFICE
CERTIFICATE OF CORRECTION

Patent No. 3,477,413                    Dated  November 11, 1969

Inventor(s)  Raymond Johnston et al.

It is certified that error appears in the above-identified patent and that said Letters Patent are hereby corrected as shown below:

IN THE SPECIFICATION:

Column 3, line 57 "52" should be -- 62 --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents